(12) United States Patent
Erickson et al.

(10) Patent No.: US 10,140,987 B2
(45) Date of Patent: Nov. 27, 2018

(54) AERIAL DRONE COMPANION DEVICE AND A METHOD OF OPERATING AN AERIAL DRONE COMPANION DEVICE

(71) Applicant: INTERNATIONAL BUSINESS MACHINES CORPORATION, Armonk, NY (US)

(72) Inventors: Thomas D. Erickson, Minneapolis, MN (US); Clifford A. Pickover, Yorktown Heights, NY (US); Komminist Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 15/267,413

(22) Filed: Sep. 16, 2016

(65) Prior Publication Data

US 2018/0082682 A1 Mar. 22, 2018

(51) Int. Cl.
*B64C 39/02* (2006.01)
*G05D 1/00* (2006.01)
(Continued)

(52) U.S. Cl.
CPC .......... *G10L 15/22* (2013.01); *B64C 39/024* (2013.01); *B64D 47/08* (2013.01); *G05D 1/0016* (2013.01);
(Continued)

(58) Field of Classification Search
CPC .............. G10L 2015/088; G10L 15/22; G10L 2015/223; G10L 15/265; G10L 15/28; G10L 15/30
See application file for complete search history.

(56) References Cited

U.S. PATENT DOCUMENTS 6,339,706 B1 1/2002 Tillgren et al.
6,975,993 B1 * 12/2005 Keiller .................... G10L 15/26
704/275
(Continued)

OTHER PUBLICATIONS

Mueller et al.; "Understanding the Design of a Flying Jogging Companion", UIST's 27th Annual ACM Symposium on, Oct. 5-8, 2014, pp. 81-82.

(Continued)

*Primary Examiner* — Eric Yen
(74) *Attorney, Agent, or Firm* — F. Chau & Associates, LLC

(57) ABSTRACT

A method of operating an aerial drone companion device includes detecting a first voice command spoken by a first user. The aerial drone companion device is autonomously oriented such that an image capture device faces the first user in response to detecting the first voice command. A second voice command spoken by the first user is detected while the image capture device faces the first user. The second voice command is transmitted from the aerial drone companion device to a computer located remotely from the aerial drone companion device. A task signal is received indicating a task to be performed. The task signal is generated by the computer based on the second voice command, and the task signal is transmitted by the computer and received by the aerial drone companion device. The method includes autonomously executing the task by the aerial drone companion device.

18 Claims, 12 Drawing Sheets

(51) Int. Cl.

| | | |
|---|---|---|
| *G10L 15/08* | (2006.01) | |
| *G10L 15/22* | (2006.01) | |
| *G10L 15/26* | (2006.01) | |
| *G10L 15/28* | (2013.01) | |
| *G10L 15/30* | (2013.01) | |
| *B64D 47/08* | (2006.01) | |
| *G10L 21/0208* | (2013.01) | |

(52) U.S. Cl.
CPC ......... *G05D 1/0094* (2013.01); *G10L 15/265* (2013.01); *G10L 15/28* (2013.01); *G10L 15/30* (2013.01); *B64C 2201/127* (2013.01); *B64C 2201/141* (2013.01); *G10L 2015/088* (2013.01); *G10L 2015/223* (2013.01); *G10L 2021/02085* (2013.01)

(56) References Cited

U.S. PATENT DOCUMENTS

| | | | |
|---|---|---|---|
| 8,271,287 B1 | 9/2012 | Kermani | |
| 8,296,383 B2 | 10/2012 | Lindahl | |
| 9,026,176 B2 | 5/2015 | Wang et al. | |
| 9,254,363 B2 | 2/2016 | Levien et al. | |
| 9,321,531 B1 | 4/2016 | Takayama et al. | |
| 2003/0182113 A1* | 9/2003 | Huang | G10L 15/30 704/231 |
| 2004/0015265 A1* | 1/2004 | Asano | B25J 13/003 700/245 |
| 2004/0054531 A1* | 3/2004 | Asano | G10L 15/20 704/231 |
| 2007/0016426 A1* | 1/2007 | Hershey | G10L 15/26 704/277 |
| 2011/0015928 A1* | 1/2011 | Odell | G10L 15/30 704/257 |
| 2013/0144627 A1 | 6/2013 | Li | |
| 2013/0173088 A1* | 7/2013 | Callou | B64C 39/024 701/2 |
| 2013/0325484 A1 | 12/2013 | Chakladar et al. | |
| 2013/0346075 A1* | 12/2013 | Felkai | G06F 3/1423 704/235 |
| 2014/0254896 A1* | 9/2014 | Zhou | B25J 9/0006 382/124 |
| 2015/0106089 A1* | 4/2015 | Parker | G06F 1/3206 704/235 |
| 2015/0266577 A1 | 9/2015 | Jones et al. | |
| 2015/0302495 A1 | 10/2015 | Stuckman et al. | |
| 2015/0341540 A1 | 11/2015 | Kim et al. | |
| 2015/0362917 A1 | 12/2015 | Wang et al. | |
| 2016/0041628 A1 | 2/2016 | Verma | |
| 2016/0063642 A1 | 3/2016 | Luciani et al. | |
| 2016/0063989 A1* | 3/2016 | Deleeuw | G10L 15/22 345/473 |
| 2016/0068264 A1 | 3/2016 | Ganesh et al. | |
| 2016/0111006 A1 | 4/2016 | Srivastava et al. | |
| 2016/0118059 A1 | 4/2016 | Hearing et al. | |
| 2017/0213268 A1* | 7/2017 | Puehse | B25J 11/0005 |

OTHER PUBLICATIONS ip.com et al.; "Method and System for Assisting a User to Walk Using a Drone Apparatus", IPCOM000241984D, Jun. 11, 2015, pp. 1-2.

ip.com et al.; "A Method and System for Alerting/Identifying Drones Within User's Proximity", IPCOM000244040D, Nov. 6, 2015, pp. 1-3.

Mell, Peter, and Grance, Timothy. "The NIST definition of cloud computing", Special Publication 800-145, pp. ii-3, (Sep. 2011).

Szoldra, Paul, "This drone can paint your house better than you can" published Mar. 18, 2016 [online at the internet: <URL: http://www.techinsider.io/apellix-drone-can-paint-homes-and-de-ice-airplanes-2016-3]. [Last Visited Aug. 19, 2016].

Carr, Austin, "How Amazon's Alexa Voice Service is Making a Play for Your Living Room" published Sep. 14, 2015 [online at the internet:<URL: http://www.fastcompany.com/3050169/how-amazons-alexa-voice-service-is-making-a-play-for-your-living-room]. [Last Visited Aug. 19, 2016].

Srinivasan, Mandyam V., Michael Poteser, and Karl Kral. "Motion detection in insect orientation and navigation." Vision research 39.16 (1999): 2749-2766.

Khazan, Olga, "This App Reads Your Emotions on Your Face" published Jan. 15, 2014 [online at the internet: <URL: http://www.theatlantic.com/technology/archive/2014/01/this-app-reads-your-emotions-on-your-face/282993/]. [Last Visited Aug. 19, 2016].

Anderson, Chris, "Amazon patents drone propellers that can say "watch out"" published Mar. 31, 2016 [online at the internet:<URL: http://diydrones.com/profiles/blogs/amazon-patents-drone-propellers-that-can-say-watch-out]. [Last Visited Aug. 19, 2016].

Editor—USA Vision, "Award for Drone Noise Reduction Technology" published Apr. 28, 2016 [online at the Internet: <URL: http://www.uasvision.com/2016/04/28/award-for-drone-noise-reduction-technology/]. [Last Visited Aug. 19, 2016].

* cited by examiner

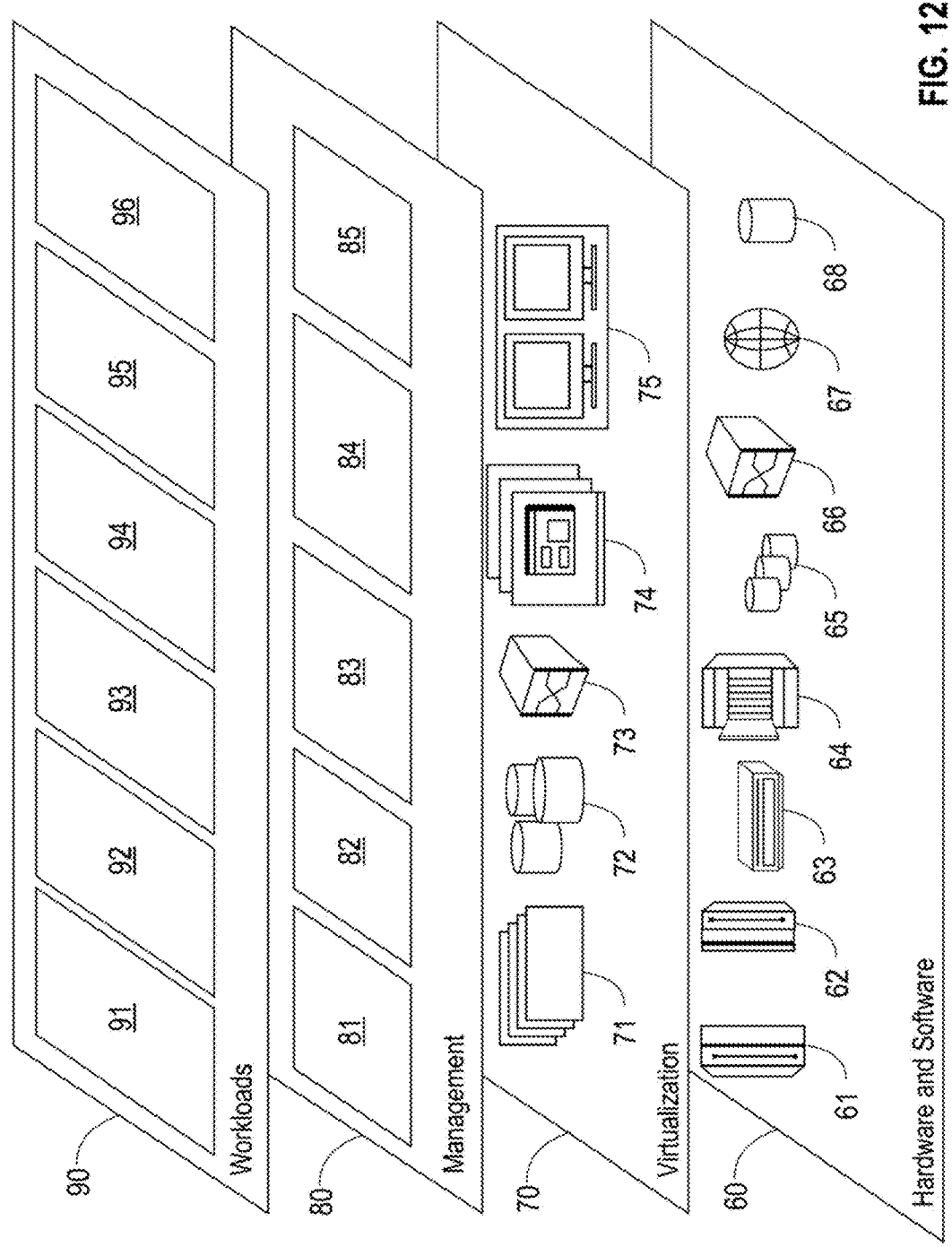

AERIAL DRONE COMPANION DEVICE AND A METHOD OF OPERATING AN AERIAL DRONE COMPANION DEVICE

BACKGROUND

Exemplary embodiments of the present invention relate to an aerial drone companion device. More particularly, exemplary embodiments of the present invention relate to a method of operating an aerial drone companion device.

An automated home, which may be referred to as a "smart home," may involve the control and automation of lighting, heating, ventilation, air conditioning (HVAC), appliances, and security. For example, a smart home may include switches and sensors connected to a central hub sometimes called a "gateway" from which the system is controlled with a user interface that is interacted either with a wall-mounted terminal, mobile phone software, tablet computer or a web interface.

A smart home may include one or more automated devices which respond to voice commands. The automated devices may include an intelligent assistant which aids in the completion of household tasks. However, current intelligent assistants are generally static devices which are not able to move about the home.

Some intelligent assistants may be mobile robots with the ability to move about a residential or commercial space. However, such devices are limited in their ability to move between different floors or different elevations. For example, mobile robots may be limited in their ability to travel from a ground level of a home to a second or third floor separated by a staircase. Additionally, mobile robots may be limited in their ability to cover relatively large distances while traveling outdoors.

SUMMARY

Exemplary embodiments of the present invention provide a method of operating an aerial drone companion device includes detecting a first voice command spoken by a first user by at least one microphone disposed on the aerial drone companion device. The aerial drone companion device is autonomously oriented such that an image capture device disposed on the aerial drone companion device faces the first user in response to detecting the first voice command. A second voice command spoken by the first user is detected by the at least one microphone while the image capture device faces the first user and while the first user looks at the image capture device. The second voice command is transmitted from the aerial drone companion device to a computer located remotely from the aerial drone companion device. A task signal is received indicating a task to be performed. The task signal is generated by the computer based on the second voice command, and the task signal is transmitted by the computer and received by the aerial drone companion device. The method of operating an aerial drone companion device includes autonomously executing the task by the aerial drone companion device.

According to an exemplary embodiment of the present invention, the first voice command may be a wakeup command that causes the aerial drone companion device to transition from a low-power operation mode to a normal operation mode.

According to an exemplary embodiment of the present invention, the aerial drone companion device may be stationed on ground while in the low-power operation mode. The aerial drone companion device may autonomously fly above the ground and follow the first user while in the normal operation mode and while the user is moving. The aerial drone companion device may be stationed on the ground while in the normal operation mode and while the user is not moving.

According to an exemplary embodiment of the present invention, the wakeup command may be predefined by the first user.

According to an exemplary embodiment of the present invention, autonomously orientating the aerial drone companion device may include at least one of autonomously flying the aerial done companion device toward the first user and autonomously rotating the aerial drone companion device such that the image capture device faces the first user.

According to an exemplary embodiment of the present invention, the second voice command may indicate a destination at which the task is to be executed. The aerial drone companion device may autonomously fly to the destination to execute the task in response to receiving the task signal.

According to an exemplary embodiment of the present invention, the second voice command may indicate a time at which the task is to be executed. The aerial drone companion device may autonomously fly to the destination at the indicated time to execute the task in response to receiving the task signal.

According to an exemplary embodiment of the present invention, the method of operating an aerial drone companion device may include generating a voice model of the first user using at least one of the first voice command, the second voice command, and additional voice commands spoken by the first user. The method of operating an aerial drone companion device may include storing the voice model of the first user in a first user record corresponding to the first user in a user database. The method of operating an aerial drone companion device may include generating a list of personalized preferences of the first user using the second voice command and previous voice commands spoken by the first user. The method of operating an aerial drone companion device may include storing the list of personalized preferences of the first user in the first user record.

According to an exemplary embodiment of the present invention, the task signal generated by the computer may be further based on the list of personalized preferences of the first user.

According to an exemplary embodiment of the present invention, the method of operating an aerial drone companion device may include creating a voice model of a second user using at least one voice command spoken by the second user. The method of operating an aerial drone companion device may include storing the voice model of the second user in a second user record corresponding to the second user in the user database. The method of operating an aerial drone companion device may include generating a list of personalized preferences of the second user using the at least one voice command spoken by the second user. The method of operating an aerial drone companion device may include storing the list of personalized preferences of the second user in the second user record. The method of operating an aerial drone companion device may include determining that the first and second user are present, using the at least one microphone, when the second voice command spoken by the first user is detected by the at least one microphone. The task signal generated by the computer may be further based on the list of personalized preferences of the first user and the second user.

According to an exemplary embodiment of the present invention, the second voice command may direct the aerial drone companion device to play music. The task signal may indicate a type of music to be played based on music preferences of the first user stored in the list of personalized preference of the first user and on music preferences of the second user stored in the list of personalized preferences of the second user.

According to an exemplary embodiment of the present invention, the method of operating an aerial drone companion device may include capturing at least one image of the first user by the image capture device. The method of operating an aerial drone companion device may include transmitting the at least one image of the first user from the aerial drone companion device to the computer located remotely from the aerial drone companion device. The method of operating an aerial drone companion device may include storing the at least one image of the first user in a first user record corresponding to the first user in a user database. The method of operating an aerial drone companion device may include generating a list of personalized preferences of the first user using the second voice command and previous voice commands spoken by the first user. The method of operating an aerial drone companion device may include storing the list of personalized preferences of the first user in the first user record.

According to an exemplary embodiment of the present invention, the task signal generated by the computer may be further based on the list of personalized preferences of the first user.

According to an exemplary embodiment of the present invention, the method of operating an aerial drone companion device may include capturing at least one image of the first user by the image capture device and determining a current cognitive state of the first user using the at least one image. The task signal generated by the computer may be further based on the current cognitive state of the first user.

According to an exemplary embodiment of the present invention, the task may include communicating with an appliance located remotely from the aerial drone companion device to execute a function of the appliance.

According to an exemplary embodiment of the present invention, the task includes placing an order for goods or services by relaying the order for goods or services from the aerial drone companion device to a seller or provider of goods or services located remotely from the aerial drone companion device.

According to an exemplary embodiment of the present invention, the method of operating an aerial drone companion device may include filtering noise generated by a propeller of the aerial drone companion device to identify the first and second voice commands spoken by the first user.

Exemplary embodiments of the present invention provide a method of operating an aerial drone companion device includes capturing at least one registration image of a user by an image capture device disposed on the aerial drone companion device and registering the user as a target user of the aerial drone companion device using the at least one registration image. The aerial drone companion device may be autonomously flown from a charging station to the target user. The aerial drone companion device locates the target user by capturing images using the image capture device while flying, and by comparing people in the captured images to the at least one registration image until the target user is identified. The aerial drone companion device cycles between autonomously docking in the charging station and autonomously flying to the target user at a predetermined interval. The method of operating an aerial drone companion device includes determining a current cognitive state of the target user by capturing at least one image of the target user using the image capture device and comparing the at least one image to a plurality of predefined images in an image database. A task is autonomously executed based on the cognitive state of the target user without receiving input from the user.

According to an exemplary embodiment of the present invention, the current cognitive state of the user may indicate that the target user requires emergency assistance, and the task may include the aerial drone companion device contacting a third party.

Exemplary embodiments of the present invention provide an aerial drone companion device includes a processor, at least one microphone that detects a first voice command and a second voice command spoken by a user under control of the processor and an image capture device. The aerial drone companion device includes a plurality of propellers that autonomously orientate the aerial drone companion device, under control of the processor, such that the image capture device faces the user in response to the at least one microphone detecting the first voice command. The second voice command is detected by the at least one microphone while the image capture device faces the first user and while the first user looks at the image capture device. The aerial drone companion device includes a network adapter that transmits the second voice command from the aerial drone companion device to a computer located remotely from the aerial drone companion device under control of the processor, and that receives a task signal from the computer indicating a task to be performed. The task signal is generated by the computer based on the second voice command. The aerial drone companion device autonomously executes the task.

BRIEF DESCRIPTION OF THE DRAWINGS

The above and other features of the present invention will become more apparent by describing in detail exemplary embodiments thereof, with reference to the accompanying drawings, in which:

FIG. 12 depicts abstraction model layers according to an embodiment of the present invention.

DETAILED DESCRIPTION

Figure 1:
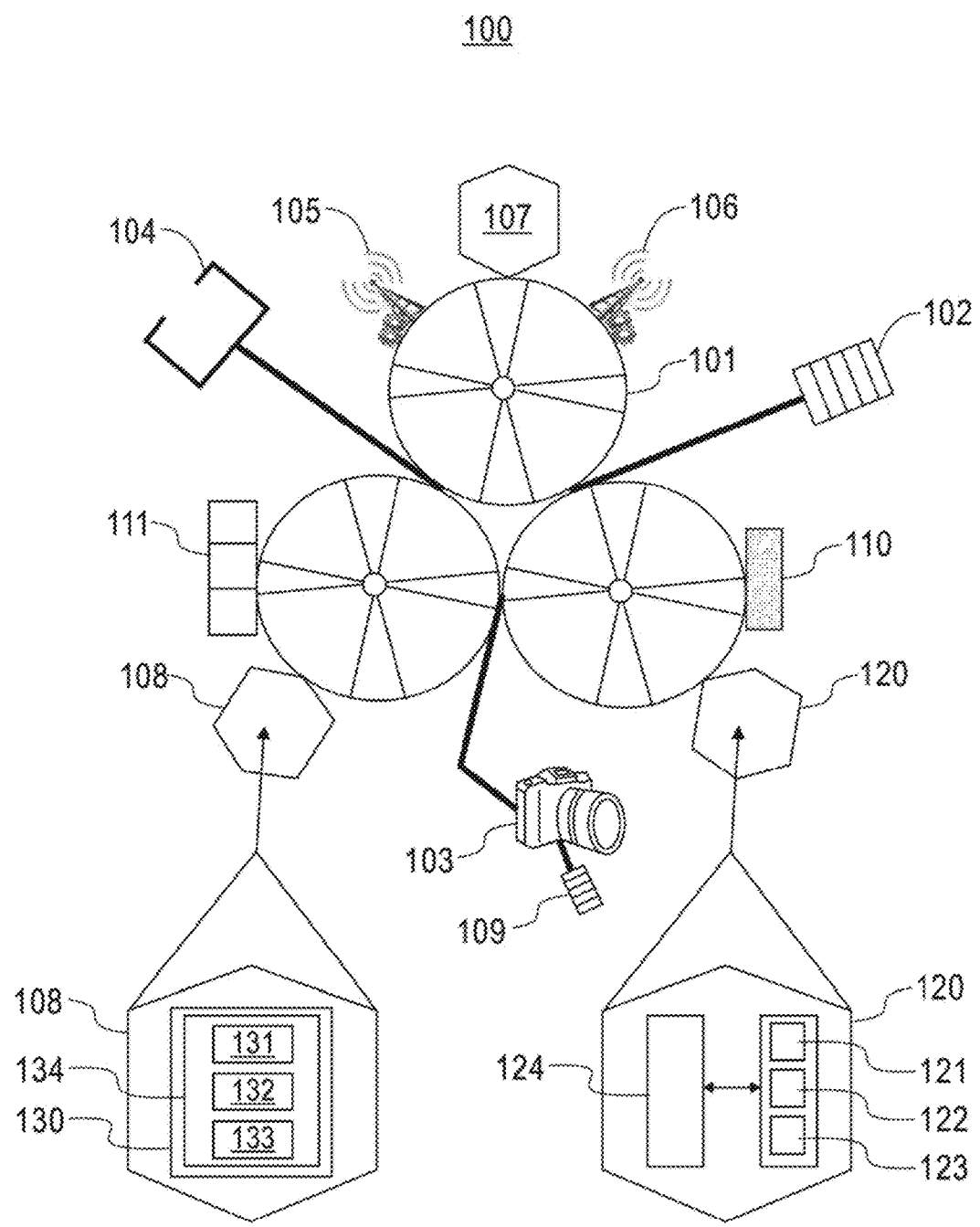
FIG. 1 illustrates an aerial drone companion device according to an exemplary embodiment of the present invention.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

A method and system according to an exemplary embodiment of the present invention may include a flying drone with voice input and output. In response to detecting a spoken keyword, the drone may wake up and orient toward the speaker of the keyword (e.g., the "user" of the drone). Based on receiving further words from the user, while the user's gaze is directed toward the drone, the drone may transmit a command to a cloud computing platform. Based on a signal returned from the cloud computing platform, the drone both replies to the user and also flies to a location in space (e.g. to play music 6 feet away on the porch of a home).

A Companion Flying Drone (CFD) may include a wireless speaker and voice command module. The CFD may be capable of voice interaction, music playback, making to-do lists, setting alarms, streaming podcasts, playing audiobooks, and providing weather, traffic and other real time information. The CFD may control several smart devices, including smart devices in the home. The terms "companion flying drone" and "aerial drone companion device" may be used interchangeably herein.

FIG. 1 illustrates an aerial drone companion device according to an exemplary embodiment of the present invention.

Referring to FIG. 1, according to an exemplary embodiment of the present invention, an aerial drone companion device 100 includes a processor 121, at least one microphone 102 that detects a first voice command and a second voice command spoken by a user (see, e.g., user 301 illustrated, for example, in FIG. 3) under control of the processor 121 and an image capture device 103. The aerial drone companion device 100 includes a plurality of propellers 101 that autonomously orientate the aerial drone companion device 100, under control of the processor 121, such that the image capture device 103 faces the user in response to the at least one microphone 102 detecting the first voice command. The second voice command is detected by the at least one microphone 102 while the image capture device 103 faces the first user and while the first user looks at the image capture device 103. The aerial drone companion device 100 includes a network adapter 105 that transmits the second voice command from the aerial drone companion device 100 to a computer (see, e.g., on-board computer 120, or remote computer 320 illustrated, for example, in FIG. 3) located remotely from the aerial drone companion device 100 under control of the processor 121, and that receives a task signal from the computer indicating a task to be performed. The task signal is generated by the computer based on the second voice command. The aerial drone companion device 100 autonomously executes the task.

According to an exemplary embodiment of the present invention, the aerial drone companion device 100 may include a battery, a GPS module 107, a Bluetooth connection module 106, at least one speaker 110, a light array 111 and an object manipulation arm 104. The GPS module 107 may be used to identify a location of the aerial drone companion device 100. The Bluetooth connection module 106 may provide Bluetooth communication between the aerial drone companion device 100 and other devices, such as the user's smart device or an appliance. The speaker 110 may be used to play music or audio books. The speaker 110 may be used for the aerial drone companion device 100 to elicit voice responses to the user. The object manipulation arm 104 may be used to operate an appliance.

According to an exemplary embodiment of the present invention, the aerial drone companion device 100 may include a voice recognition module 108. The voice recognition module may include a voice command interface 130 and a control circuit 134 including a microphone 131, a level conversion circuit 132 and a voice processing circuit 133. The voice recognition module 108 is illustrated in FIG. 1, for example, as being on-board the aerial drone companion device 100. However, the voice recognition module 108 may also be stored in the cloud, and may be accessed, for example, by the network adapter 105. The voice recognition module 108 is described in more detail below.

According to an exemplary embodiment of the present invention, the aerial drone companion device 100 may include an on-board computer 120. The on-board computer 120 may include an interaction information hub 124, a processor 121, a memory 122 and a user database 123. The on-board computer 120 is illustrated in FIG. 1, for example, as being on-board the aerial drone companion device 100. However, the on-board computer 120 may be omitted, and the aerial drone companion device 100 may communicate with the remote computer 320. The on-board computer 120 may be substantially the same as the remote computer 320 except for being disposed on the aerial drone companion device 100. The remote computer 320 is described below in more detail.

According to an exemplary embodiment of the present invention, the image capture device 103 may include a built-in microphone 109. The built-in microphone 109 may be disposed on the image capture device 103 and may capture one or more voice commands from one or more users according to exemplary embodiments of the present invention. The image capture device 103 may also receive one or more voice commands from the microphone 102. Voice commands may be transmitted from the built-in microphone 109 and/or the microphone 102 to the on-board computer 120 and/or to the remote computer 320.

According to an exemplary embodiment of the present invention, the light array 111 may include a plurality of lights. For example, the light array 111 may include red, yellow and green lights. The lights may be used to provide a signal from the aerial drone companion device 100 to the user. For example, a green light may indicate that the aerial drone companion device 100 has a relatively full battery, while a red light may indicate the battery is almost exhausted. Additionally, the lights may be used to communicate whether a voice command has been received and/or interpreted correctly to a reasonable level of confidence, as discussed below in more detail.

According to an exemplary embodiment of the present invention, the voice control circuit 134 of the voice recognition module 108 may include the microphone 131, the level conversion circuit 132 and the voice processing circuit 133. The voice control circuit 134 may include a voice operated switch connected between the microphone 131 and the level conversion circuit 132. The microphone 131 may pick up voice commands, the voice operated switch may receive the voice commands from the microphone 131, and output a high voltage signal when a volume of the voice commands is greater than or equal to a predetermined volume threshold or is within a predetermined volume range. The level conversion circuit 132 may convert the high voltage signal into a low voltage signal for turning on the aerial drone companion device 100. The voice command interface 130 need not be activated until a message (e.g., an e-mail, a text message, or a voice mail) has been received by the aerial drone companion device 100. The arrival of a message may be used to trigger the voice command interface 130 by activating one or more speech recognition routines in a predetermined time period corresponding to the one or more speech recognition routines. The voice command interface 130 may signal the aerial drone companion device 100 to turn off, and/or return to a charging station and/or enter a low power/sleep mode when the predetermined time period expires or the user has no further commands.

According to an exemplary embodiment of the present invention, a short-range range wireless data and voice communication link, for example using Bluetooth technology, may be established between a remote control device and the aerial drone companion device 100. To activate voice control circuitry in the aerial drone companion device 100, a user may supply an input to the remote control device. In response to the user input, wireless link circuitry within the remote control device may send a control signal, for example an AT command, to the aerial drone companion device 100. The aerial drone companion device 100 may receive the control signal and transmits a control signal indicating the status of the aerial drone companion device 100. Once the voice control circuitry is activated, the user may provide a voice command to the remote control device. The remote control device may transmit the voice signal to the aerial drone companion device 100 over the wireless communication link. The aerial drone companion device 100 may process the voice signal in the voice control circuitry and generate instructions in response to the voice signal. The voice control circuitry (e.g., the voice command interface 130 of the voice recognition module 108) may be located within the aerial drone companion device 100 and not within the remote control device, which may simplify the remote control device and may reduce the amount of power dissipated in the remote control device.

According to an exemplary embodiment of the present invention, the aerial drone companion device 100 may use the multimodalities of social intelligent embodied cognitive agents' implementation to personalize the companion tasks by sensing and responding to users, objects, and emotions all by applying deep neural net and visual analytics techniques, and by leveraging cloud computing capabilities.

According to an exemplary embodiment of the present invention, the aerial drone companion device 100 may use or reuse planning and reasoning, including scripting, rule-based, and learned (e.g., via genetic programming and reinforcement) while facilitating multimodal interactions with the user. The aerial drone companion device 100 may be adapted to control multiple controlled drones in coordination so that each coordinated drone is made to perform the same or a different function in response to a single voice command. The aerial drone companion device 100 may learn user habits, as discussed in more detail below with reference to FIG. 8.

Figure 2:
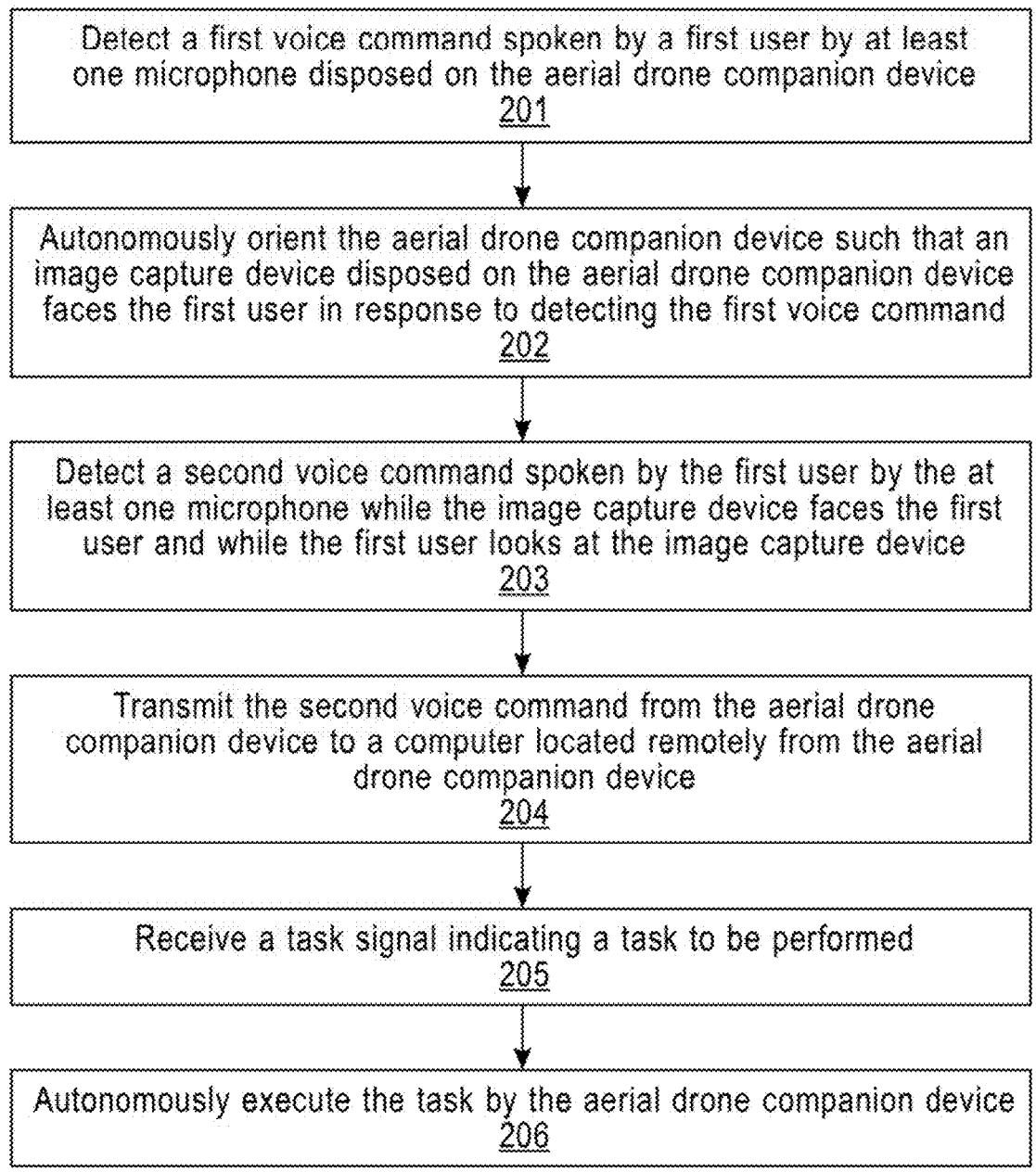
FIG. 2 illustrates a method of operating an aerial drone companion device according to an exemplary embodiment of the present invention.
Figure 3:
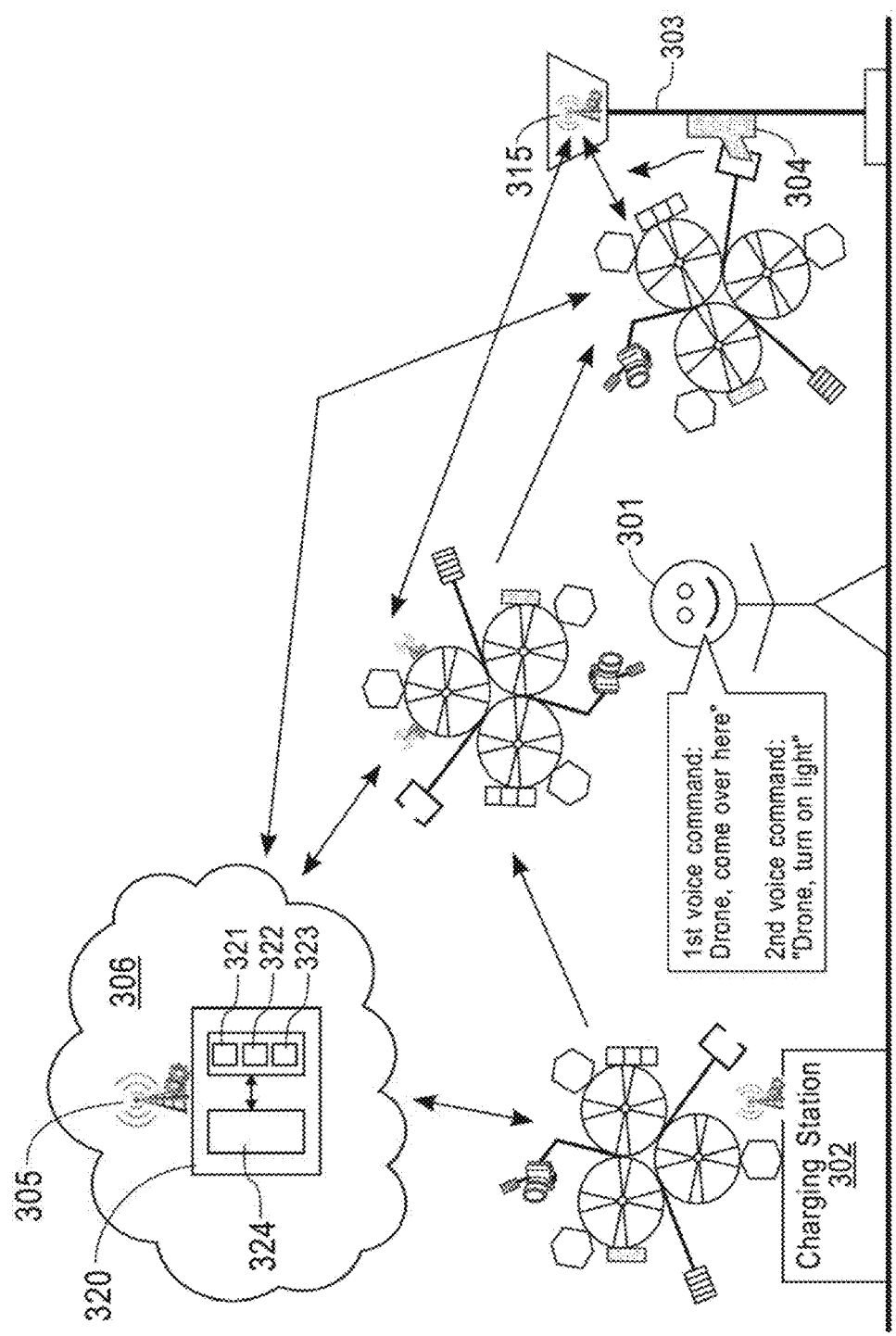
FIG. 3 illustrates a method of operating an aerial drone companion device according to an exemplary embodiment of the present invention.

FIG. 2 illustrates a method of operating an aerial drone companion device according to an exemplary embodiment of the present invention. FIG. 3 illustrates a method of operating an aerial drone companion device according to an exemplary embodiment of the present invention.

Referring to FIGS. 2 and 3, according to an exemplary embodiment of the present invention, a method of operating an aerial drone companion device includes detecting a first voice command spoken by a first user by at least one microphone disposed on the aerial drone companion device 201. The aerial drone companion device is autonomously oriented such that an image capture device disposed on the aerial drone companion device faces the first user in response to detecting the first voice command 202. A second voice command spoken by the first user is detected by the at least one microphone while the image capture device faces the first user and while the first user looks at the image capture device 203. The second voice command is transmitted from the aerial drone companion device to a computer located remotely from the aerial drone companion device 204. A task signal is received indicating a task to be performed 205. The task signal is generated by the computer (e.g., the remote computer 320) based on the second voice command, and the task signal is transmitted by the computer and received by the aerial drone companion device 100. The method of operating an aerial drone companion device 100 includes autonomously executing the task by the aerial drone companion device.

According to an exemplary embodiment of the present invention, speech recognition and/or natural language processing may be employed in generating the task signal, as discussed below in more detail.

According to an exemplary embodiment of the present invention, the first and second voice commands may be uttered by the user 301. The aerial drone companion device 100 may receive the first command and may receive a first task signal from the remote computer 320 to leave a charging station 302, fly to the general vicinity of the user 301 and orient the image capture device 103 toward the user's face to capture the user's gaze. Alternatively, the first command may be parsed and the first task signal may be received from the on-board computer 120. Thus, the aerial drone companion device 100 may fly toward the user 301 and may orient the image capture device 103 toward the user's face.

According to an exemplary embodiment of the present invention, the computer (e.g., the remote computer 320) may receive input (e.g., in the form of voice, gesture, or an explicit command) and may apply one or more analytics modules to recognize the type of task to be performed, and finally generate the task list. Based on the received input task signal form the one or more modules may utilize one or more analytic algorithms and models, which may include voice recognition, gesture detection (e.g., using deep learning or neural network), and/or visual analytics. The models are trained or built using historical and longitudinal task signals stored on one or more databases, as described herein.

According to an exemplary embodiment of the present invention, determining whether the user's gaze is directed toward the aerial drone companion device 100 may help the aerial drone companion device's advanced imaging system increase the its confidence level in the identification of the speaker of the command or query, and may help the aerial drone companion device 100 assess a possible additional cognitive aspect of the command (e.g., based on facial expression). Even though the user will typically use an initial trigger word like, "Drone, fly to the head of the bed to wake me up in the morning," the confidence level in the command being directed to the drone will increase based on user's gaze. For example, if the aerial drone companion device 100 is able to detect and register the user's gaze (e.g., for a predetermined amount of time) it may increase a confidence level that the aerial drone companion device 100 is, in fact, intended to receive a command uttered by the user.

According to an exemplary embodiment of the present invention the aerial drone companion device 100 might not require a user's gaze to be focused on the aerial drone companion device 100. For example, the user may be focused on a task requiring their hands (e.g., fixing something) and may not want to look away, or the aerial drone companion device 100 may have proactively initiated an interaction with a child or elderly person who may not be so focused on the aerial drone companion device 100. Additionally, the user or individual interacting with the drone may have a visual or mobility impairment that makes gazing at the aerial drone companion device 100 difficult or impossible.

According to an exemplary embodiment of the present invention, the first voice command may be a wakeup command that causes the aerial drone companion device 100 to transition from a low-power operation mode to a normal operation mode. The wakeup command may be predefined by the first user (e.g., before the aerial drone companion device enters a low power mode or docks with the charging station—see, e.g. FIG. 8).

The low-power operation mode may be a form of a sleep mode in which the drone uses a minimal or reduced amount of power, but is still capable of receiving or generating task signals. For example, the aerial drone companion device 100 may be landed/not flying when in low-power mode, or may still be flying but have certain features (e.g., WiFi, Bluetooth, cell service, camera) turned off to save power. Normal operation mode may have substantially all hardware turned on and ready to accept commands and communicate with outside devices (e.g. an appliance) and/or the remote computer 320. However, exemplary embodiments of the present invention are not limited thereto and the aerial drone companion device 100 is not necessarily in low power operation mode when it is stationary or not flying. That is, the aerial drone companion device 100 may be docked with the charging station, connected to external power, or resting on the ground or on another surface (e.g., not flying), while still in normal operation mode (e.g., full or near-full power mode). Further, the aerial drone companion device 100 may be waiting for a user's command even when not in low-power operation mode (e.g., the aerial drone companion device 100 may be waiting for a user's command while it is in normal operation mode). For example, the aerial drone companion device 100 may be docked to a power source and be in normal mode and waiting for a user's command.

According to an exemplary embodiment of the present invention, the aerial drone companion device 100 may be docked with the charging station 302. The charging station may provide ground power to the aerial drone companion device 100 while the aerial drone companion device 100 is charging. The charging station 302 may include a wireless communication antenna, may receive a signal (e.g., from the user) and may communicate the signal to the aerial drone companion device 100 without the use of the network adapter 105 aerial drone companion device 100. Thus, the aerial drone companion device 100 may use little or no battery power while connected with the charging station 302.

According to an exemplary embodiment of the present invention, the aerial drone companion device 100 may be stationed on ground while in the low-power operation mode. The aerial drone companion device 100 may autonomously fly above the ground and follow the first user while in the normal operation mode and while the user is moving. The aerial drone companion device 100 may be stationed on the ground while in the normal operation mode and while the user is not moving. That is, the aerial drone companion device 100 may follow the user. For example, the aerial drone companion device 100 may use voice or facial recognition to identify a primary user of the aerial drone companion device 100 and once the primary user is identified, the aerial drone companion device 100 may hover a predetermined distance away from the user as obstructions allow. In the event the primary user is lost, the aerial drone companion device 100 may identify the location of the user via the user's Smartphone or other smart device. Bluetooth, WiFi, cell tower networks or other short range radio frequency communication may be used to identify the location of a user's Smartphone or other smart device (e.g., Smart Watch). If a secondary user has most recently activated the aerial drone companion device 100 then the aerial drone companion device 100 may follow that secondary user until the primary user issues a command to the aerial drone companion device 100.

According to an exemplary embodiment of the present invention, the task may include communicating with an appliance (e.g., the appliance 103) located remotely from the aerial drone companion device to execute a function of the appliance. The appliance may be one of a light and a media device. The task may include turning the light on or off when the appliance is the light. The task may include executing a media function of the media device when the appliance is the media device.

The aerial drone companion device 100 may receive a task command to turn on the appliance 103, which may be alight including an activation switch 304. The aerial drone companion device 100 may reorient itself with the object manipulation arm 104 temporarily coupled to or in contact with the activation switch 304. The activation switch 304 may be moved (e.g., in an upward direction) and the appliance may be turned on. The appliance 303 may include a wireless or Bluetooth connection antenna 315 and may communicate wirelessly with the aerial drone companion device 100.

The aerial drone companion device may include the network adapter 105 and/or the Bluetooth connection module 106. The aerial drone companion device 100 may connect to and communicate with a cell tower communication network, may include WiFi connectivity capability or any other short range radio communication capability, as desired.

The remote computer 320 may include a wireless connection antenna 305, an interaction information hub 324, a processor 321, a memory 322 and a user database 323. The remote computer 320, the interaction information hub 324, the processor 321, the memory 322 and the user database 323 may perform substantially the same functions as the on-board computer 120, the interaction information hub 124, the processor 121, the memory 122 and the user database 123 described above with reference to FIG. 1. The remote computer 320 will be described in more detail below with reference to FIGS. 5-8.

The remote computer 320 is illustrated as accessed through the cloud 306. However, exemplary embodiments of the present invention are not limited thereto. For example, the remote computer 320 might not be accessed through the cloud.

According to an exemplary embodiment of the present invention, the task signal may be generated by the remote computer 320 by performing natural language processing (NLP) to parse a received voice command (e.g., the second voice command). For example NLP may include parsing the voice command into words, searching a database for keywords, and determining what the user is asking the drone to do based on the keywords. For example, a first user (User A—see, e.g., FIG. 8) may prefer a certain type of music be played at a certain type of day. The user may be identified by voice and/or facial recognition, as described according to exemplary embodiments of the present invention herein. The NLP process performed by the remote computer 320 may identify the term "music" and may identify the time of day. The combination of identifying User A, the term "music" and a time of day may result in a command to play a certain type of music. For example, as discussed in more detail below with reference to FIG. 8, if the time is 7:30 PM and User A is identified, upbeat music might be played.

According to an exemplary embodiment of the present invention, the aerial drone companion device 100 may generate a task through learning models embodied in the drone's on-board computer 120. One or more applications may run on the aerial drone companion device 100 that use the in-drone deployed learning models. The aerial drone companion device 100 may use the remote computer 320 for advanced processing, advanced analytics, and/or data storage. The in-drone learning models and algorithms may be updated by fetching from the remote computer 320.

NLP may include sentence segmentation, speech tagging (e.g., part of speech tagging) and language parsing. Deep analytics may be employed to extract specific information from multiple score data sets, such as a segmented and tagged sentence. A database of keywords may be used to identify keywords understood by the remote computer 320. Named entity extraction may be employed. Name entity extraction may be used for data mining. A named entity or definition (e.g., a word or phrase) identifying an item of interest may be searched in a tagged and parsed sentence. NLP may include automated summarization in which identified keywords are combined to extract meaning from a tagged and parsed sentence. For example, the terms/phrases "music" "deck" "in 5 minutes" "hover at 5 feet above" may be identified and understood in a particular sentence spoken by a user and may lead the remote computer 320 to transmit a task signal of "travel to User A's deck in 5 minutes, however at 5 feet above the deck and play upbeat music." The "upbeat" task may be identified from User A's preferences, as discussed below in more detail with reference to FIG. 8.

According to an exemplary embodiment of the present invention, autonomously orientating the aerial drone companion device 100 may include at least one of autonomously flying the aerial done companion device 100 toward the first user and autonomously rotating the aerial drone companion device 100 such that the image capture device 103 faces the first user.

According to an exemplary embodiment of the present invention, the second voice command may indicate a destination at which the task is to be executed. The aerial drone companion device 100 may autonomously fly to the destination to execute the task in response to receiving the task signal.

According to an exemplary embodiment of the present invention, the second voice command may indicate a time at which the task is to be executed. The aerial drone companion device 100 may autonomously fly to the destination at the indicated time to execute the task in response to receiving the task signal.

Figure 4:
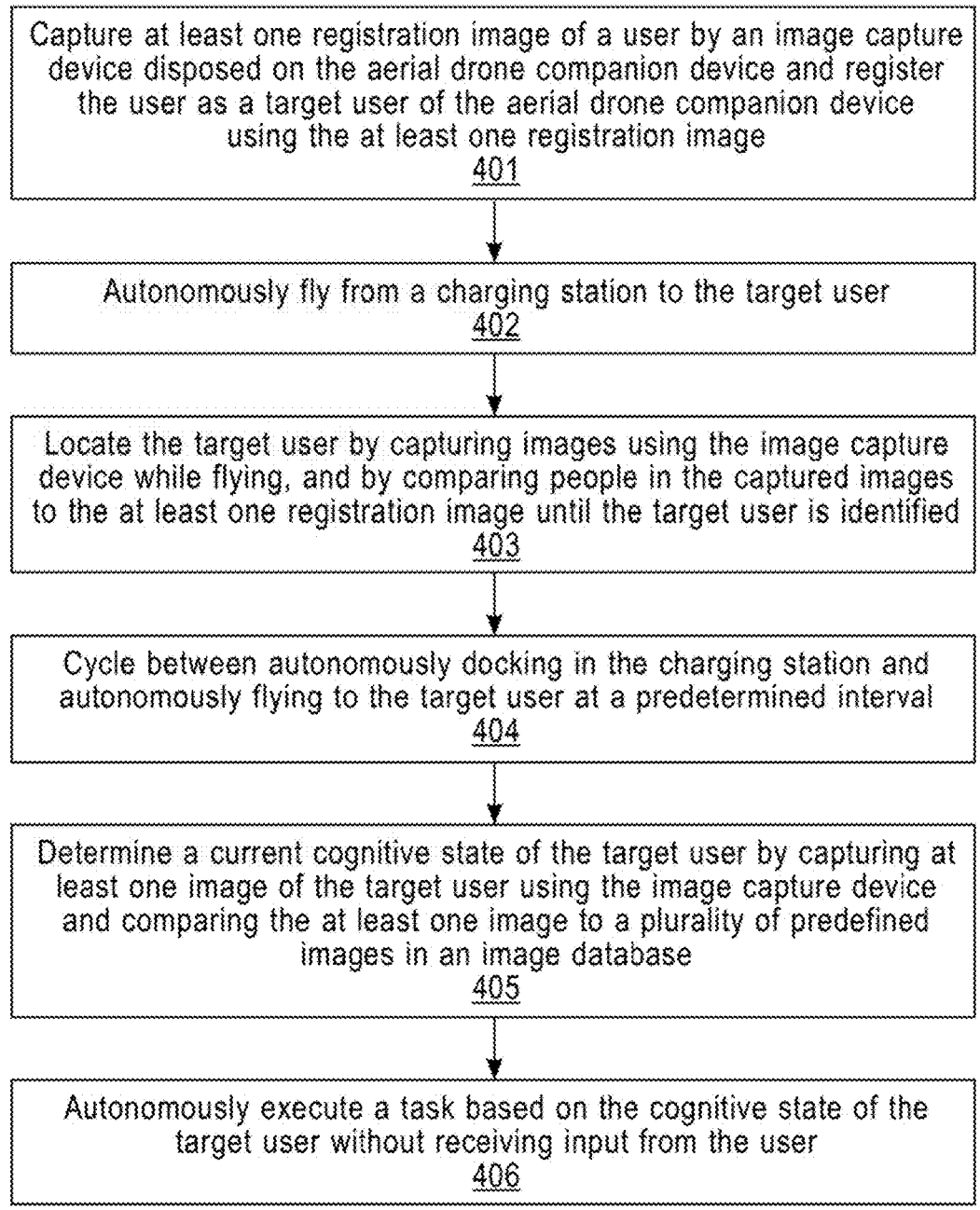
FIG. 4 illustrates a method of operating an aerial drone companion device according to an exemplary embodiment of the present invention.

FIG. 4 illustrates a method of operating an aerial drone companion device according to an exemplary embodiment of the present invention.

Referring to FIG. 4, according to an exemplary embodiment of the present invention, a method of operating an aerial drone companion device includes capturing at least one registration image of a user by an image capture device disposed on the aerial drone companion device and registering the user as a target user of the aerial drone companion device using the at least one registration image 401. The aerial drone companion device is autonomously flown from a charging station to the target user 402. The aerial drone companion device locates the target user by capturing images using the image capture device while flying, and by comparing people in the captured images to the at least one registration image until the target user is identified 403. The aerial drone companion device cycles between autonomously docking in the charging station and autonomously flying to the target user at a predetermined interval 404. The method of operating an aerial drone companion device includes determining a current cognitive state of the target user by capturing at least one image of the target user using the image capture device and comparing the at least one image to a plurality of predefined images in an image database 405. A task is autonomously executed based on the cognitive state of the target user without receiving input from the user 406.

According to an exemplary embodiment of the present invention, a captured user image may be compared with stored user images, as discussed in more detail below with reference to FIG. 6.

According to an exemplary embodiment, the aerial drone companion device 100 may be set to check on a user (e.g., an elderly user or a child) at set intervals (e.g., every 30 minutes). For example, as discussed below in more detail, in addition to facial expression analysis, the aerial drone companion device 100 may detect a posture or body position of a user or another individual (e.g., to identify if someone is on the ground and potentially injured).

According to an exemplary embodiment, the method of operating the aerial drone companion device 100 may include filtering noise generated by the propellers 101 of the aerial drone companion device 100 to identify the first and second voice commands spoken by the first user. For example, a pitch or angle of the propellers 101 may be adjusted to minimize noise generated by the propellers 101. Alternatively, the aerial drone companion device 100 may land on a nearby object and reduce or stop a rotation of the propellers 101 to better hear a user's command. Additionally, a speed of the engines rotating the propellers 101 may be reduced to reduce noise generated by the propellers 101.

Reducing or filtering noise generated by the propellers 101 of the aerial drone companion device 100 may include active noise control (ANC), which may also be referred to as noise cancellation or active noise reduction (ANR). ANC may reduce unwanted sound by the addition of a second sound specifically designed to cancel the first. Alternatively, reducing or filtering noise generated by the propellers 101 of the aerial drone companion device 100 may include Adaptive broadband filtration, Adaptive inverse filtration, Frequency Compensation Impulse filtration, Dynamic processing, and/or Stereo processing. Speaker identification, speech enhancement and audio restoration algorithms may also be employed, as described herein.

Figure 5:
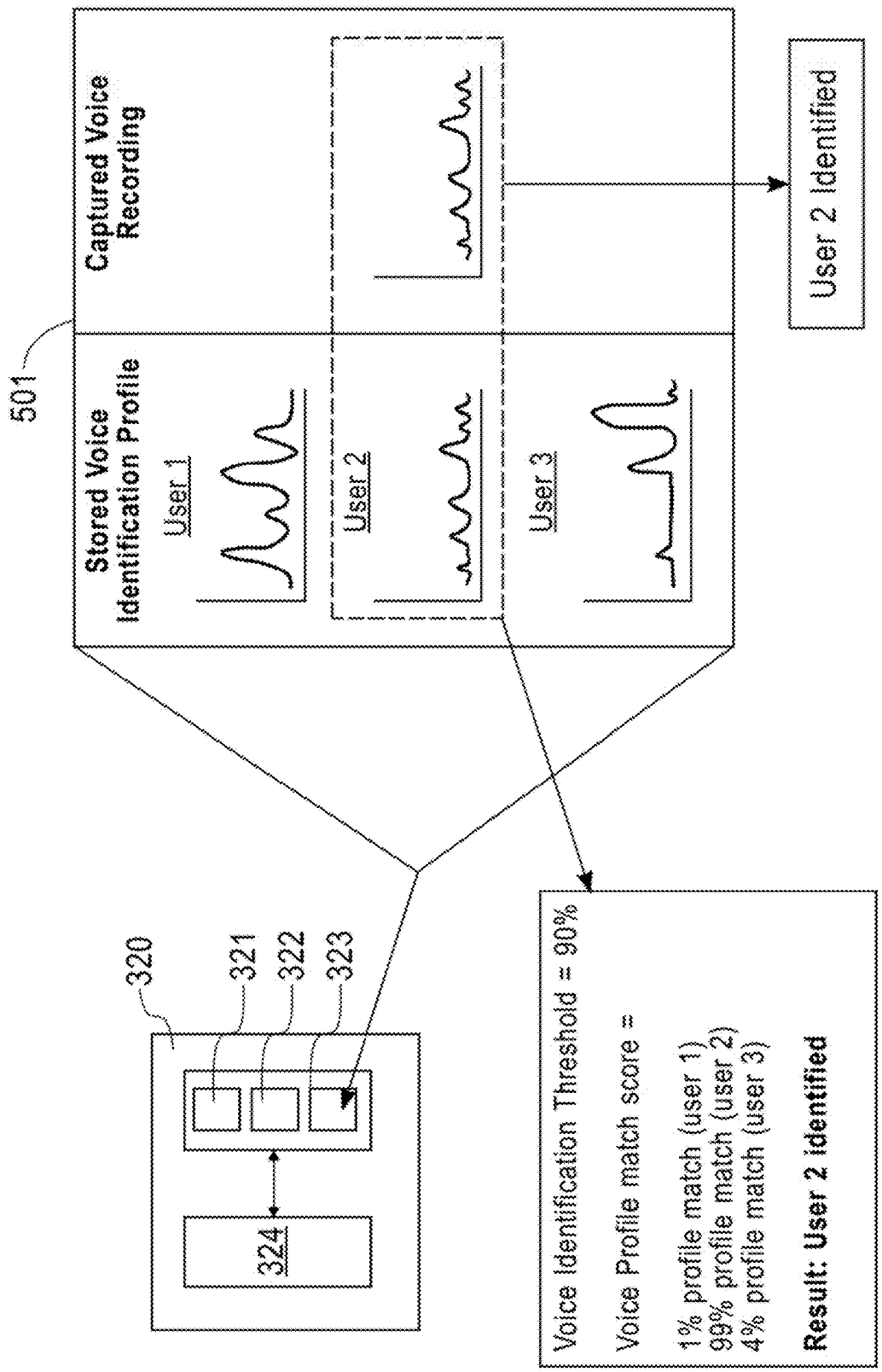
FIG. 5 illustrates a method of voice recognition by an aerial drone companion device according to an exemplary embodiment of the present invention.

FIG. 5 illustrates a method of voice recognition by an aerial drone companion device according to an exemplary embodiment of the present invention.

Referring to FIG. 5, according to an exemplary embodiment of the present invention, the remote computer 320 and/or the on-board computer 120 of the aerial drone companion device 100 may perform voice recognition of one or more users. The method of operating an aerial drone companion device 100 may include generating a voice model of the first user (see, e.g., voice identification profile for User 1, User 2 and User 3 illustrated in FIG. 5) using at least one of the first voice command, the second voice command, and additional voice commands spoken by the first user. The method of operating an aerial drone companion device 100 may include storing the voice model of the first user in a first user record corresponding to the first user in a user database 323. The method of operating an aerial drone companion device may include generating and maintaining a list of personalized preferences of the first user (see, e.g., FIG. 8) using the second voice command and previous voice commands spoken by the first user. The method of operating an aerial drone companion device may include storing the list of personalized preferences of the first user in the first user record (see, e.g., FIG. 8). The generation, tabulation and storage of user preferences is discussed below in more detail with reference to FIG. 8.

According to an exemplary embodiment of the present invention, a speech recognition algorithm may be employed for identifying one or more users. For example, speech recognition may employ a Hidden Markov Model, dynamic time warping (DTP)-based speech recognition, neural networks, deep feedforward and/or recurrent neural networks.

According to an exemplary embodiment of the present invention, the method of operating an aerial drone companion device 100 may include creating a voice model of a second user using at least one voice command spoken by the second user. The method of operating an aerial drone companion device may include storing the voice model of the second user in a second user record corresponding to the second user in the user database 323. The method of operating an aerial drone companion device 100 may include generating a list of personalized preferences (see, e.g., FIG. 8) of the second user using the at least one voice command spoken by the second user. The method of operating an aerial drone companion device 100 may include storing the list of personalized preferences (see, e.g., FIG. 8) of the second user in the second user record. The method of operating an aerial drone companion device 100 may include determining that the first and second user are present, using the at least one microphone (e.g., microphone 102), when the second voice command spoken by the first user is detected by the at least one microphone. The task signal generated by the computer (e.g., the on-board computer 120 and/or the remote computer 320) may be further based on the list of personalized preferences of the first user and the second user. The generation, tabulation and storage of user preferences is discussed below in more detail with reference to FIG. 8.

According to an exemplary embodiment of the present invention, a voice recognition module 501 may identify one or more users by voice recognition. A voice identification profile may be stored for each of a plurality of users. A captured voice recording of a user may be used to identify the user. The on-board computer 120 and/or the remote computer 320 may compare the captured voice recording and a list of stored voice identification profiles stored in the user database 323. A voice identification threshold may be set at any desired level. The voice identification threshold may be a minimum similarity level at which a captured voice recording is considered sufficiently the same as a stored voice identification profile to result in a match and identification of a stored user. For example, the voice identification threshold may be set at 90%. The on-board computer 120 and/or the remote computer 320 may compare the captured voice recording and a list of stored voice identification profiles stored in the user database 323. If the captured recording profile and the stored voice identification profile match at a level of 90% or higher, then the corresponding user is identified. The similarly between a plurality of data points on the line graphs illustrated in FIG. 5 may be compared between the stored profiles and the captured profile and on a scale of 0-100. For example, 90/100 data points matching would result in a voice match profile score of 90%. If the voice match profile score is at least 90% when the identification threshold is set to 90% then a match is made of the corresponding user. In the example illustrated in FIG. 5, the threshold is set at 90% and the profile match score for User 2 is 99%, and thus User 2 is identified as having uttered the captured voice recording. However, exemplary embodiments of the present invention are not limited thereto, and voice identification analysis may be performed as desired.

According to an exemplary embodiment of the present invention, the aerial drone companion device 100 may determine an approximate location of a user's spoken voice (e.g., to better reorient itself to face the user and to detect the user's gaze, as discussed herein in more detail). Source direction may be detected using the time difference of arrival (TDOA) method, which may employ one or more pressure microphones and/or particle velocity probes. For example, the microphones described herein (e.g., 102, 109 and 131) may be pressure microphones).

With a sensor array (e.g., a microphone array including more than one microphone) consisting of at least two probes it is possible to obtain the source direction using the cross-correlation function between each probes' signal. The cross-correlation function between two microphones is defined as $$R_{x1,x2}(\tau) = \sum_{n=-\infty}^{\infty} x_1(n) x_2(n+\tau),$$

which defines the level of correlation between the outputs of two sensors x_1 and x_2. In general, a higher level of correlation means that the argument \tau is relatively close to the actual time-difference-of-arrival. For two sensors next to each other the TDOA is given by $$\tau_{true} = \frac{d_{spacing}}{c}$$

where c is the speed of sound in the medium surrounding the sensors and the source.

An example of TDOA is the interaural time difference. The interaural time difference is the difference in arrival time of a sound between two ears. The interaural time difference is given by $$\Delta t = \frac{x \sin\theta}{c}$$

where \Delta t is the time difference in seconds, x is the distance between the two sensors (ears) in meters, \theta is the angle between the baseline of the sensors (ears) and the incident sound, in degrees.

Figure 6:
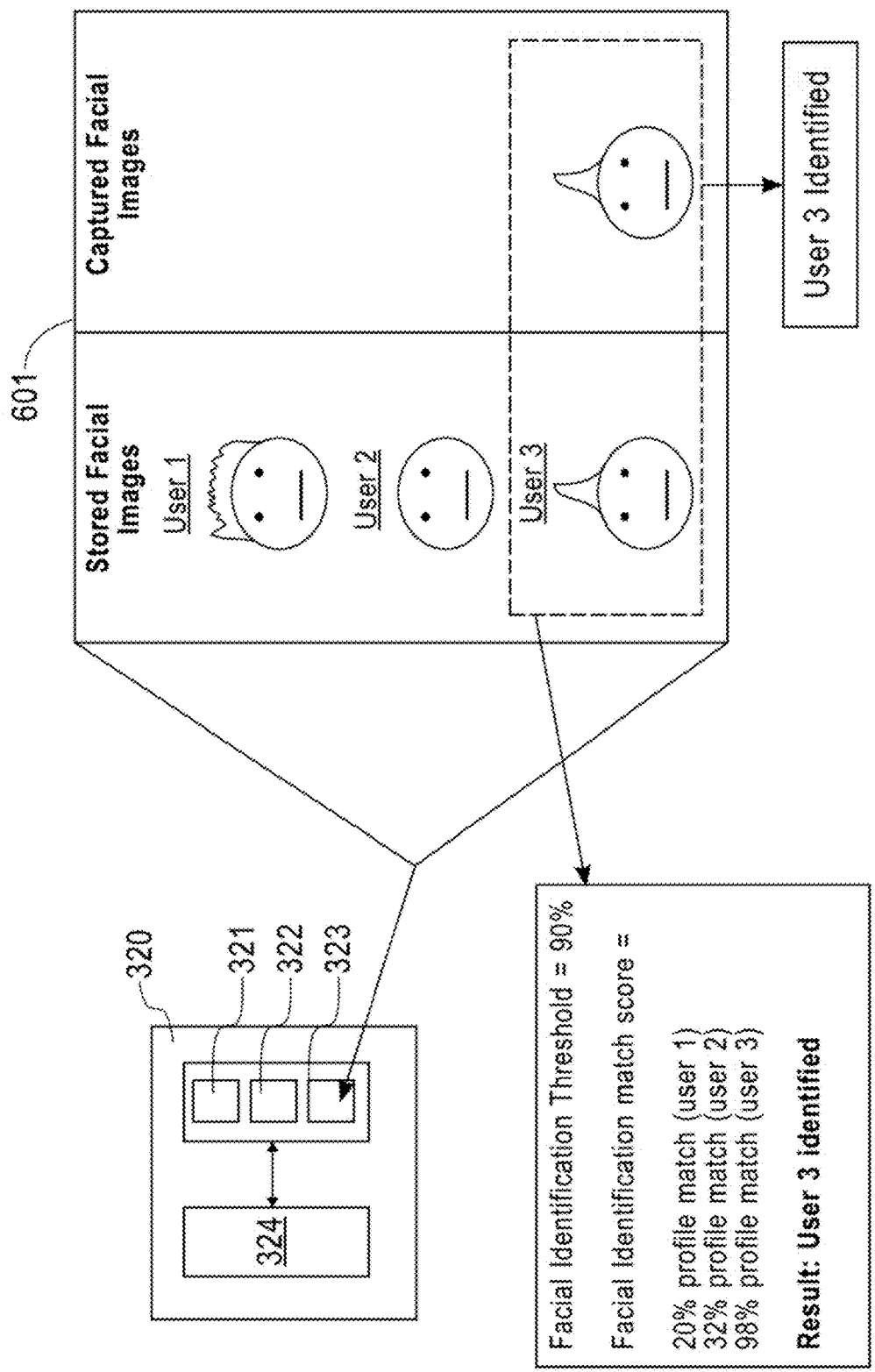
FIG. 6 illustrates a method of facial recognition by an aerial drone companion device according to an exemplary embodiment of the present invention.

FIG. 6 illustrates a method of facial recognition by an aerial drone companion device according to an exemplary embodiment of the present invention.

Referring to FIG. 6, according to an exemplary embodiment of the present invention, a facial recognition module 601 may identify one or more users by facial images. A facial image may be stored for each of a plurality of users. A captured facial image (e.g., captured by the image capture device 103) may be used to identify the user. The on-board computer 120 and/or the remote computer 320 may compare the captured facial image and a list of stored facial images stored in the user database 323. A facial identification threshold may be set at any desired level. The facial identification threshold may be a minimum similarity level at which a captured facial image is considered sufficiently the same as a stored facial to result in a match and identification of a stored user. For example, the facial identification threshold may be set at 90%. The on-board computer 120 and/or the remote computer 320 may compare the captured facial image and a list of stored facial images stored in the user database 323. If the captured facial image and the stored facial image match at a level of 90% or higher, then the corresponding user is identified. The similarly between a plurality of data points on the captured facial image may be compared between the stored facial image and the captured facial image and on a scale of 0-100. For example, 90/100 data points matching would result in facial image identification match score of 90%. If the facial image identification match score is at least 90% when the identification threshold is set to 90% then a match is made of the corresponding user. In the example illustrated in FIG. 6, the threshold is set at 90% and the profile match score for User 3 is 98%, and thus User 3 is identified. However, exemplary embodiments of the present invention are not limited thereto, and facial recognition analysis may be performed as desired.

Figure 7:
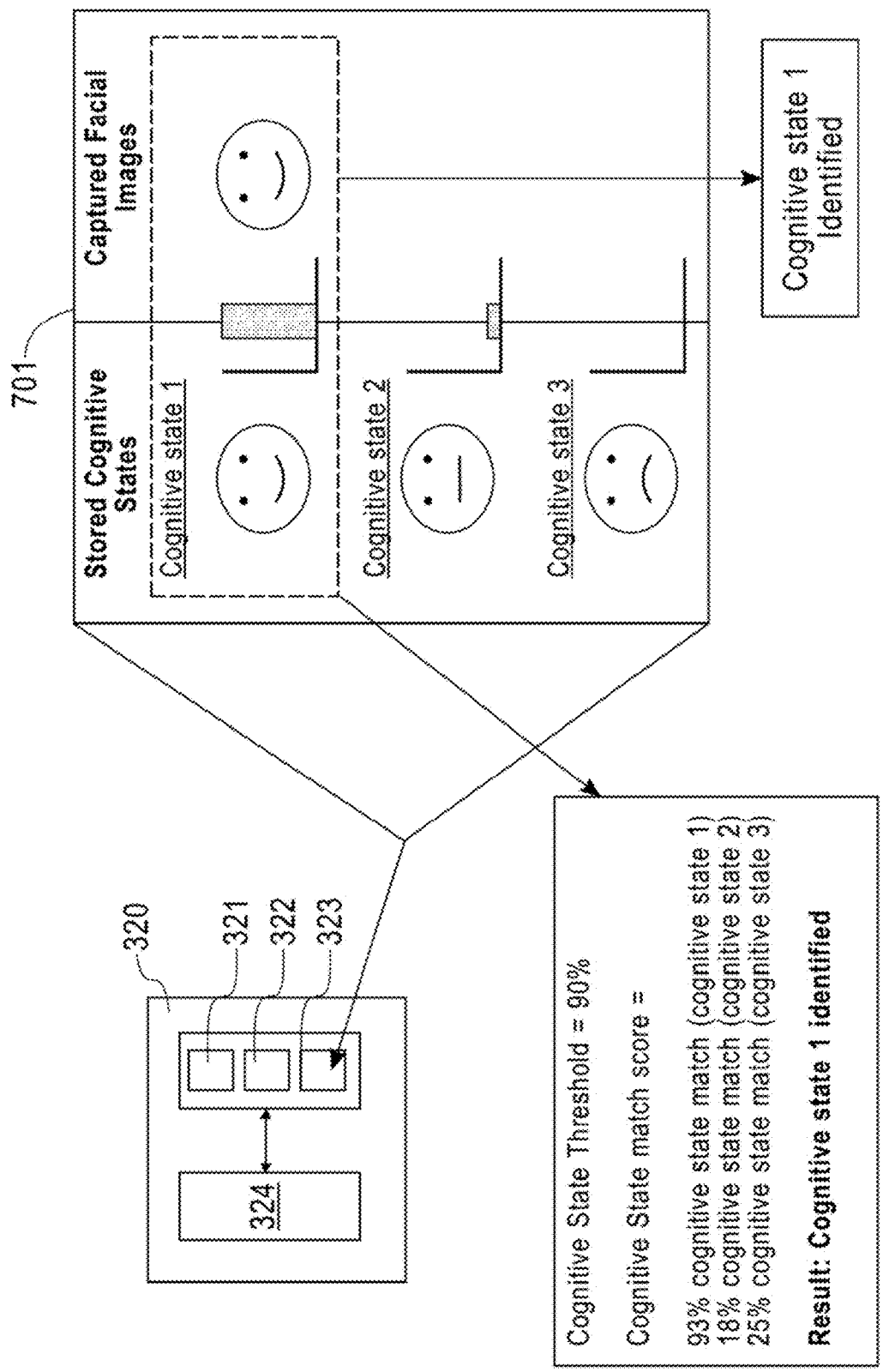
FIG. 7 illustrates a method of cognitive state identification by an aerial drone companion device according to an exemplary embodiment of the present invention.

FIG. 7 illustrates a method of cognitive state identification by an aerial drone companion device according to an exemplary embodiment of the present invention.

Referring to FIG. 7, according to an exemplary embodiment of the present invention, the method of operating an aerial drone companion device 100 may include capturing at least one image of the first user by the image capture device 103 and determining a current cognitive state of the first user using the at least one image. The task signal generated by the computer (e.g., 120 or 320) may be further based on the current cognitive state of the first user.

According to an exemplary embodiment of the present invention, a cognitive state identification module 701 may identify one or more cognitive states of a user (e.g., happy, sad or frustrated). A plurality of facial images corresponding with different cognitive states may be stored in the user database 323. A captured facial image (e.g., captured by the image capture device 103) may be used to identify the cognitive state of a user. The on-board computer 120 and/or the remote computer 320 may compare the captured facial image and a list of stored facial images stored in the user database 323. A cognitive state identification threshold may be set at any desired level. The cognitive state identification threshold may be a minimum similarity level at which a captured facial image is considered sufficiently the same as a stored facial to result in a match and identification of a cognitive state. For example, the cognitive state identification threshold may be set at 90%. The on-board computer 120 and/or the remote computer 320 may compare the captured facial image and a list of stored facial images stored in the user database 323. If the captured facial image and the stored facial image match at a level of 90% or higher, then the corresponding cognitive state may be identified. The similarity between a plurality of data points on the captured facial image may be compared between the stored facial image and the captured facial image and on a scale of 0-100. For example, 90/100 data points matching would result in a cognitive state match score of 90%. If the cognitive state match score is at least 90% when the identification threshold is set to 90% then a match is made of the corresponding cognitive state. In the example illustrated in FIG. 7, the threshold is set at 90% and the profile match score for cognitive state 1 is 98%, and thus cognitive state 1 is identified. However, exemplary embodiments of the present invention are not limited thereto, and cognitive state analysis may be performed as desired.

According to an exemplary embodiment of the present invention, detecting and characterizing a cognitive state of a user may include analyzing gaze activity, facial expressions, body motions, and/or voice variation, etc. Deep learning, visual analytics, and other statistical algorithms such as simple k-nearest neighbor classifier, and/or SVM may be employed in detecting an characterizing cognitive states.

The current cognitive state of the user may indicate that the target user requires emergency assistance, and the task may include the aerial drone companion device 100 contacting a third party. For example a 911 operator may be contact through a cell phone communication network by the aerial drone companion device 100. Alternatively, police or fire rescue services may be contacted without the need for the user saying anything (e.g., a cognitive state of "in-pain" or "distressed" may be identified). The microphone 102 and the speaker 110 of the aerial drone communication device 100 may be used to enable a call between emergency services and a user without the need for the user to pick up a phone. The aerial drone communication device 100 may transmit text messages or emails, such as through voice to text communication from the user.

According to an exemplary embodiment of the present invention, in addition to recognizing cognitive states such as happy or sad based on facial expressions, the cognitive state identification module 701 may identify user postures, such as standing upright, laying in bed, or fallen down and likely injured. For example, an elderly user may be identified as being on the ground (i.e., not in bed), unresponsive and with their eyes closed. This may be detected by determining a body position and an inability to detect a gaze of the user. Law enforcement or emergency personnel may be contact by the aerial drone companion device 100 (e.g., through a cell tower communication network).

According to an exemplary embodiment of the present invention, a task may be modified based on a cognitive state. For example, if a sad cognitive state is detected, the aerial drone communication device 100 may tell a joke, play uplifting music or bring the user a particular object. For example, a column for cognitive state may be added to the table described below with reference to FIG. 8, and may be used to modify user preferences and thus to modify a task signal.

Figure 8:
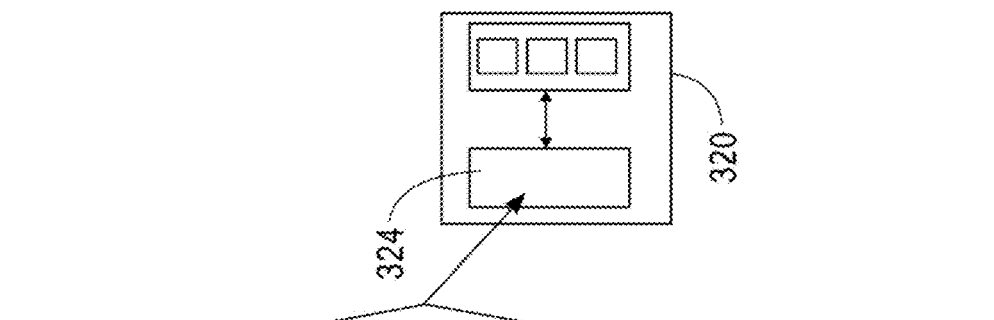
FIG. 8 illustrates a method of storing and accessing user preferences by an aerial drone companion device according to an exemplary embodiment of the present invention.

FIG. 8 illustrates a method of storing and accessing user preferences by an aerial drone companion device according to an exemplary embodiment of the present invention.

Referring to FIG. 8, the interaction information hub 124 and/or 324 may generate and store a user interaction and preference table 801. For example, the computer (e.g., 120 or 320) may determine that User A prefers upbeat music in the evening and slow paced music in the morning.

According to an exemplary embodiment of the present invention, the task signal generated by the computer (e.g., 120 or 320) may be further based on the list of personalized preferences of the first user. A list of exemplary user preferences is illustrated in the user interaction and preference table 801 described with reference to FIG. 8.

According to an exemplary embodiment of the present invention, the second voice command may direct the aerial drone companion device 100 to play music. The task signal may indicate a type of music to be played based on music preferences of the first user stored in the list of personalized preference of the first user and on music preferences of the second user stored in the list of personalized preferences of the second user.

According to an exemplary embodiment of the present invention, the method of operating an aerial drone companion device 100 may include capturing at least one image of the first user by the image capture device 103. The method of operating an aerial drone companion device 100 may include transmitting the at least one image of the first user from the aerial drone companion device 100 to the computer (e.g., 120 or 320), which may be located remotely from the aerial drone companion device 100. The method of operating an aerial drone companion device 100 may include storing the at least one image of the first user in a first user record corresponding to the first user in a user database 323. The method of operating an aerial drone companion device 100 may include generating a list of personalized preferences of the first user using the second voice command and previous voice commands spoken by the first user. The method of operating an aerial drone companion device 100 may include storing the list of personalized preferences of the first user in the first user record (see, e.g., the user interaction and preference table 801 described with reference to FIG. 8). Thus, the task signal generated by the computer (e.g., 120 or 320) may be further based on the list of personalized preferences of the first user.

Figure 9:
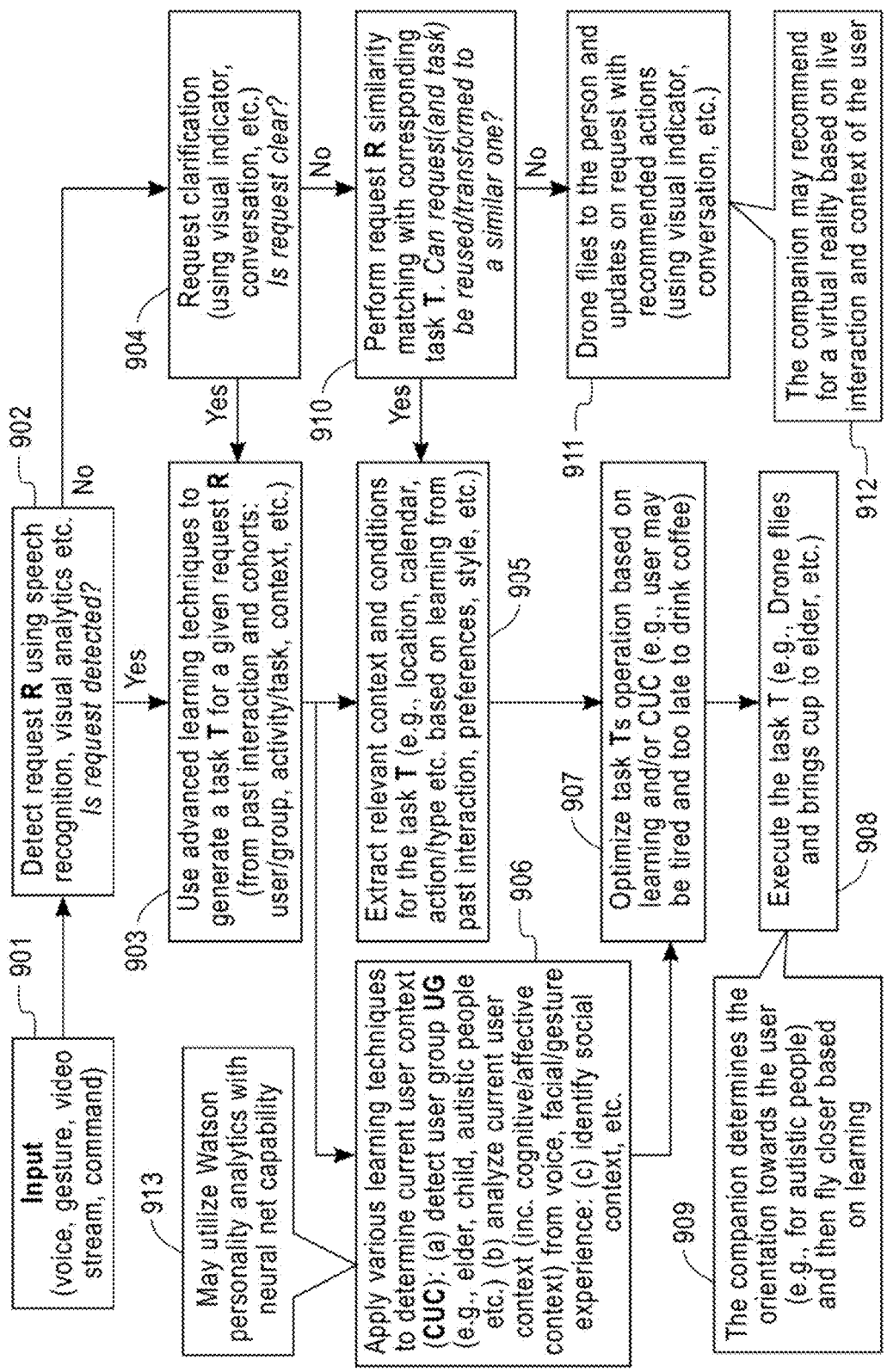
FIG. 9 illustrates a method of operating an aerial drone companion device according to an exemplary embodiment of the present invention.

FIG. 9 illustrates a method of operating an aerial drone companion device according to an exemplary embodiment of the present invention.

Referring to FIG. 9, a method of operating an aerial drone companion device 100 may include receiving an input 901 at the aerial drone companion device 100. The input may include a voice or gesture command. A direct request 902 may be detected by the aerial drone companion device 100. If the request is detected a learning technique may be applied to generate a task for a given request 903. The learning technique may include a comparison with past user interactions (see, e.g., the user interaction and preference table 801 described with reference to FIG. 8). If the request is not detected, or is not clearly detected a request clarification may be sent by the aerial drone companion device 100 (e.g., by using the light array 111 or the speaker 110). Relevant context and conditions for the task may be determined 905. One or more learning techniques may be applied to determine a current user context 906. For example, a user group (e.g., elderly person or child); a current user context (e.g., cognitive state); and/or social context (e.g., outdoors or indoors in a crowded space) may be determined. The task may be optimized based on the learning performed and the context determined 907. The task may be executed by the drone 908. The aerial drone companion device 100 may orient itself based on the learning performed or the context determined (e.g., to clarify the task) 909.

According to an exemplary embodiment of the present invention, if the request was not clarified (e.g., at block 904) then a task similarity matching procedure may be applied to determine if the current task request is similar to a past task request 910. If the task can then be identified, then the procedure will continue from block 905. If the task is still not identified, then the aerial drone companion device 100 may fly closer to the user and update the user on the status of the requested task 911. The aerial drone companion device 100 may provide one or more recommendations to the user 912.

According to an exemplary embodiment of the present invention, the aerial drone companion device 100 may determine an optimal or improved way for the aerial drone companion device 100 to learn for an individual or for a group in a cohort. The aerial drone companion device 100 may orient toward the user appropriately (e.g., closer for someone with hearing impairment to hear sounds emitted from the aerial drone companion device 100). The aerial drone companion device 100 may intelligently store or ingest learned information by one or more drone and intelligently respond to new user command (e.g. speech, gesture) and may compose/orchestrate activities to maximize the owner's productivity based on user cohort (e.g. busy schedule fetched from the user Calendar) and user patterns. A personalized longitudinal history (e.g., generate a diary about a child for the parent based on the child historic activities or interactions with the drone) may be generated.

According to an exemplary embodiment of the present invention, the aerial drone companion device 100 may assess automatically orchestrate group interest in a home by detecting individual people (e.g., from their voice), learning their common interest and suggesting common activity (or based on majority interest). For example, the drone may say: "It is Sunday Afternoon, you all like the new movie by Leonardo DiCaprio on Netflix". The aerial drone companion device 100 may initiate interaction/conversation (via phone or video conference) with person's personal doctor based on the analysis of the user cohort. This capability of the drone may be set (e.g., ON or OFF) by the owner of the user and the aerial drone companion device 100 may communicate (e.g., to get permission via command) with the person prior to initiating said interaction or conversation. The aerial drone companion device 100 may further be equipped with virtual reality console powered by Watson Personality Analytics and activated by the drone based learning of user cohort.

According to an exemplary embodiment of the present invention, the aerial drone companion device 100 may be shared with a number of people (e.g., a family). Thus, over a time aerial drone companion device 100 may change modes based on different interaction pattern per user. The aerial drone companion device 100 may recognize individual users living in a single home by applying speech recognition techniques, or gesture based interaction through visual analytics. The aerial drone companion device 100 may maintain and update personalized preferences or styles of individual users. In the case of multiple users present at the same time, the aerial drone companion device 100 may apply similarity analysis (e.g., clustering) to identify and play/recommend common interests (e.g. songs, video) to the family. The aerial drone companion device 100 may support and recognize multimodal user interactions, and respond to it appropriately based on the context. The event logs generated through these interactions may be uploaded into the Interaction Information Hub 124 or 324 (e.g., in the Cloud) for further analytics and personalization.

The orientation of the aerial drone companion device 100 with respect to the speaker or user may be a change in direction of the aerial drone companion device 100, a flight towards the speaker or user. The aerial drone companion device 100 may follow the user when the user is walking around the home, or taking a walk on the user's property. The aerial drone companion device 100 may include 3D spatial and other features. By removing the need to use buttons, dials and switches, consumers can easily operate appliances or give commands, with their hands full or while doing other tasks.

The aerial drone companion device 100 may follow the user and optionally land when the user is still. The aerial drone companion device 100 may pick up small objects (e.g., with the object manipulation arm 104) and take video (e.g., with the image capture device 103). The aerial drone companion device 100 may be capable of voice interaction, music playback (e.g., from a location you ask the drone to fly to), making to-do lists, setting alarms (e.g., from a location you ask the drone to fly to), streaming podcasts, playing audio books, and providing weather, traffic and other real time information.

According to an exemplary embodiment of the present invention the speaker 110 may be a Bluetooth speaker, which may play music from a connected device, such as a Smartphone. The aerial drone companion device 100 may respond to a user's questions about items in an electronic calendar. The aerial drone companion device 100 may match questions with existing Q&A (e.g., from past interactions) to see if they can be answered. If not, the aerial drone companion device 100 may seek a remote response from the interaction information hub 124 or 324.

According to an exemplary embodiment of the present invention, the visual systems of the aerial drone companion device 100 may be highly sensitive to motion. The motion processing in the aerial drone companion device 100 may be similar to an insects' optomotor response. This response, which is a turning response evoked by the apparent movement of the visual environment, serves to stabilize the aerial drone companion device's orientation with respect to the environment and the user, and to be more responsive to the user. The optomotor response may be complemented by audio processing and source localization via multiple sensors and methods that use the time difference of arrival (TDOA) technique. Interaural time differences (interaural phase differences) and interaural level differences play a role for the hearing of many animals.

According to an exemplary embodiment of the present invention, the visual systems of the aerial drone companion device 100 may have TV integration. The aerial drone companion device 100 may serve the function of a television remote control.

According to an exemplary embodiment of the present invention, the visual systems of the aerial drone companion device 100 may include thermostat integration. For example, the following interaction may occur "Drone, it's cold." "Sorry, Cliff, let me turn up the temperature." The aerial drone companion device 100 may sync with smartphone apps.

Figure 10:
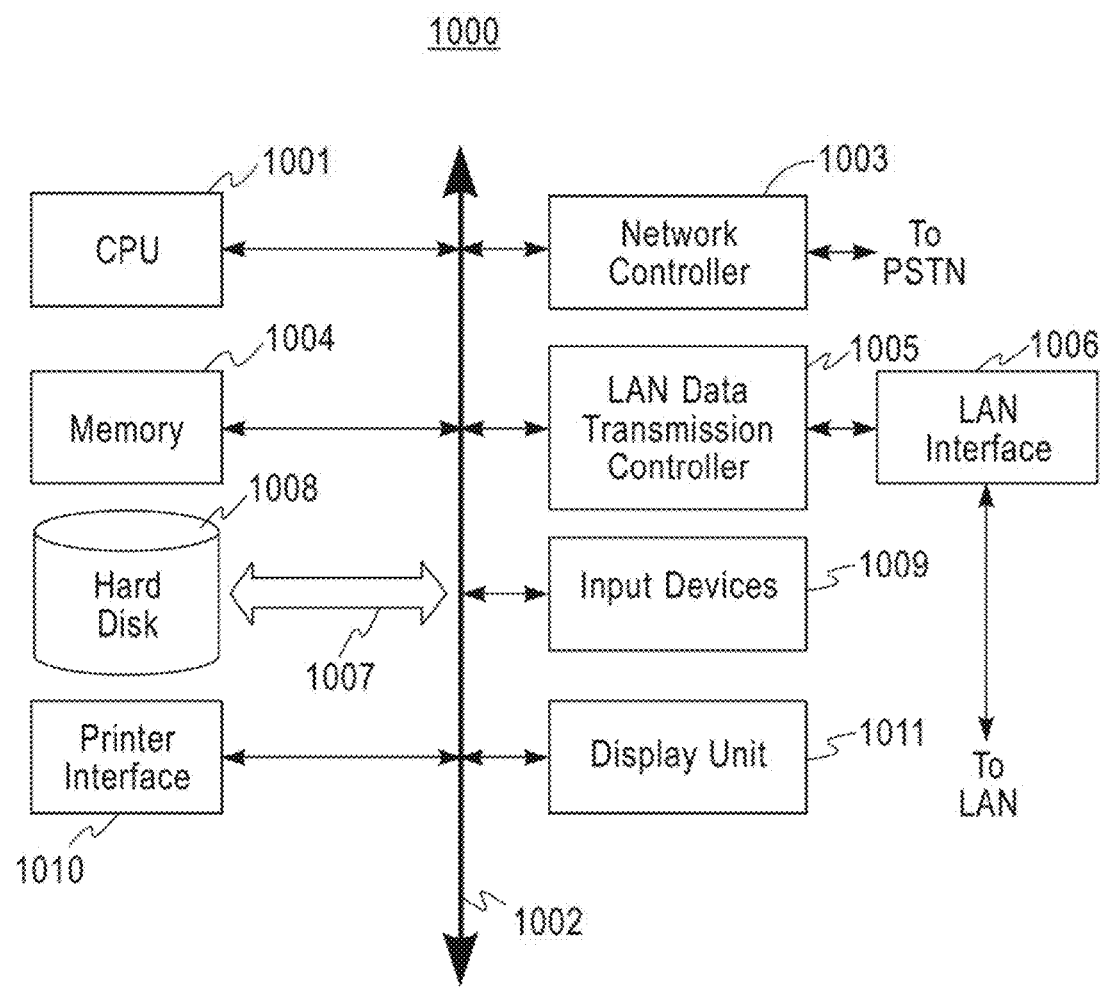
FIG. 10 illustrates an example of a computer system capable of implementing the methods according to exemplary embodiments of the present invention.

FIG. 10 illustrates an example of a computer system capable of implementing the methods according to exemplary embodiments of the present invention.

The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Figure 11:
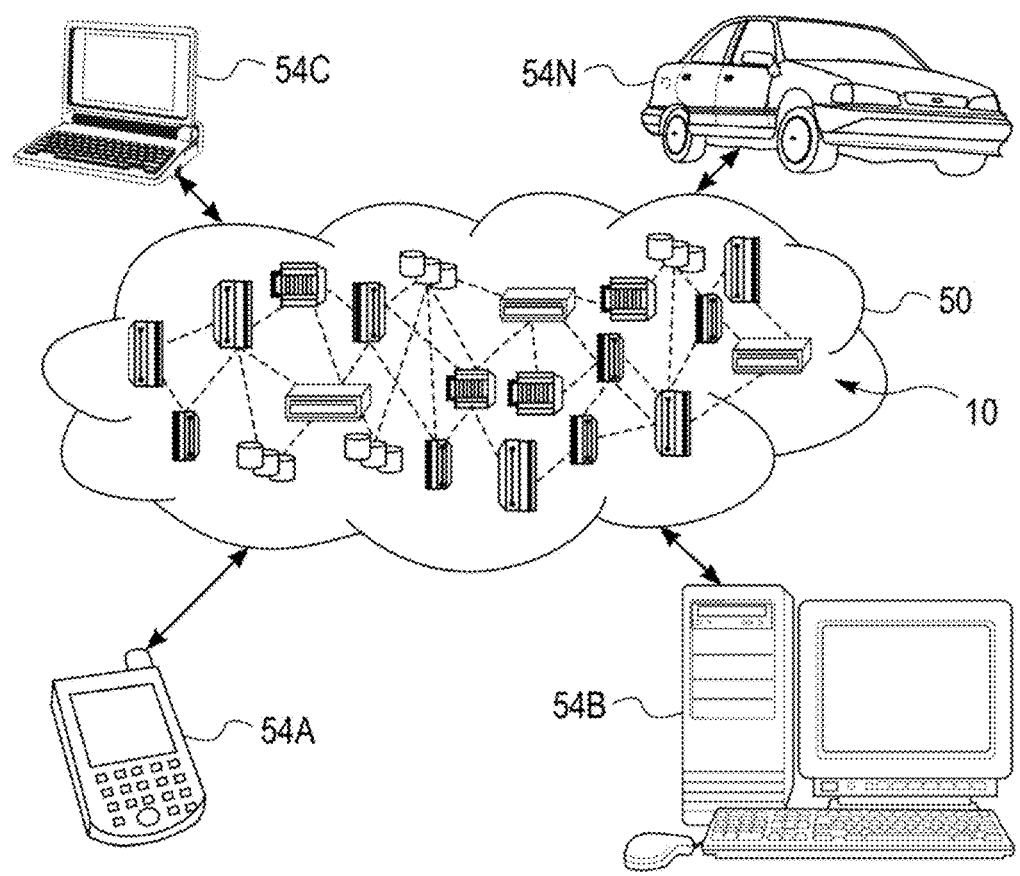
FIG. 11 depicts a cloud computing environment according to an embodiment of the present invention.

FIG. 11 depicts a cloud computing environment according to an embodiment of the present invention. FIG. 12 depicts abstraction model layers according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (see, e.g., FIGS. 1-9).

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a voice command analysis module 96, which may perform, for example. NLP, as discussed above in more detail.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A method of operating an aerial drone companion device, comprising:
   detecting a first voice command spoken by a first user by at least one microphone disposed on the aerial drone companion device;
   autonomously orientating the aerial drone companion device such that an image capture device disposed on the aerial drone companion device faces the first user in response to detecting the first voice command;
   detecting a second voice command spoken by the first user by the at least one microphone while the image capture device faces the first user and while the first user looks at the image capture device;
   transmitting the second voice command from the aerial drone companion device to a computer located remotely from the aerial drone companion device;
   receiving a task signal indicating a task to be performed, wherein the task signal is generated by the computer based on the second voice command, and the task signal is transmitted by the computer and received by the aerial drone companion device; and
   autonomously executing the task by the aerial drone companion device.

2. The method of claim 1, wherein the first voice command is a wakeup command that causes the aerial drone companion device to transition from a low-power operation mode to a normal operation mode.

3. The method of claim 2, wherein the aerial drone companion device is stationed on ground while in the low-power operation mode, autonomously flies above the ground and follows the first user while in the normal operation mode and while the user is moving, and is stationed on the ground while in the normal operation mode and while the user is not moving.

4. The method of claim 2, wherein the wakeup command is predefined by the first user.

5. The method of claim 1, wherein autonomously orientating the aerial drone companion device comprises at least one of autonomously flying the aerial drone companion device toward the first user and autonomously rotating the aerial drone companion device such that the image capture device faces the first user.

6. The method of claim 1, wherein the second voice command indicates a destination at which the task is to be executed, and the aerial drone companion device autonomously flies to the destination to execute the task in response to receiving the task signal.

7. The method of claim 6, wherein the second voice command further indicates a time at which the task is to be executed, and the aerial drone companion device autonomously flies to the destination at the indicated time to execute the task in response to receiving the task signal.

8. The method of claim 1, further comprising:
   generating a voice model of the first user using at least one of the first voice command, the second voice command, and additional voice commands spoken by the first user;
   storing the voice model of the first user in a first user record corresponding to the first user in a user database;
   generating a list of personalized preferences of the first user using the second voice command and previous voice commands spoken by the first user; and
   storing the list of personalized preferences of the first user in the first user record.

9. The method of claim 8, wherein the task signal generated by the computer is further based on the list of personalized preferences of the first user.

10. The method of claim 8, further comprising:
    creating a voice model of a second user using at least one voice command spoken by the second user;
    storing the voice model of the second user in a second user record corresponding to the second user in the user database;
    generating a list of personalized preferences of the second user using the at least one voice command spoken by the second user;
    storing the list of personalized preferences of the second user in the second user record; and
    determining that the first and second users are present, using the at least one microphone, when the second voice command spoken by the first user is detected by the at least one microphone,
    wherein the task signal generated by the computer is further based on the list of personalized preferences of the first user and the list of personalized preferences of the second user.

11. The method of claim 10, wherein the second voice command directs the aerial drone companion device to play music, and the task signal indicates a type of music to be played based on music preferences of the first user stored in the list of personalized preferences of the first user and on music preferences of the second user stored in the list of personalized preferences of the second user.

12. The method of claim 1, further comprising:
    capturing at least one image of the first user by the image capture device;
    transmitting the at least one image of the first user from the aerial drone companion device to the computer located remotely from the aerial drone companion device;
    storing the at least one image of the first user in a first user record corresponding to the first user in a user database;
    generating a list of personalized preferences of the first user using the second voice command and previous voice commands spoken by the first user; and
    storing the list of personalized preferences of the first user in the first user record.

13. The method of claim 12, wherein the task signal generated by the computer is further based on the list of personalized preferences of the first user.

14. The method of claim 1, further comprising:
    capturing at least one image of the first user by the image capture device; and
    determining a current cognitive state of the first user using the at least one image,
    wherein the task signal generated by the computer is further based on the current cognitive state of the first user.

15. The method of claim 1, wherein the task comprises communicating with an appliance located remotely from the aerial drone companion device to execute a function of the appliance.

16. The method of claim 1, wherein the task comprises placing an order for goods or services by relaying the order for goods or services from the aerial drone companion device to a seller or provider of goods or services located remotely from the aerial drone companion device.

17. The method of claim 1, further comprising:
    filtering noise generated by a propeller of the aerial drone companion device to identify the first and second voice commands spoken by the first user.

18. An aerial drone companion device, comprising:

a processor;

at least one microphone that detects a first voice command and a second voice command spoken by a user under control of the processor;

an image capture device;

a plurality of propellers that autonomously orientate the aerial drone companion device, under control of the processor, such that the image capture device faces the user in response to the at least one microphone detecting the first voice command, wherein the second voice command is detected by the at least one microphone while the image capture device faces the user and while the user looks at the image capture device; and a network adapter that transmits the second voice command from the aerial drone companion device to a computer located remotely from the aerial drone companion device under control of the processor, and that receives a task signal from the computer indicating a task to be performed, wherein the task signal is generated by the computer based on the second voice command, wherein the aerial drone companion device autonomously executes the task.

* * * * *